(12) United States Patent
Priest et al.

(10) Patent No.: US 6,519,397 B2
(45) Date of Patent: Feb. 11, 2003

(54) PREMISES CABLE WITH FIBERGLASS REINFORCEMENT

(75) Inventors: James R. Priest, Nashport, OH (US); Richard N. Lehman, Newark, OH (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 0 days.

(21) Appl. No.: 09/873,137

(22) Filed: Jun. 1, 2001

(65) Prior Publication Data

US 2002/0191923 A1 Dec. 19, 2002

(51) Int. Cl.$^7$ ................................................. G02B 6/44
(52) U.S. Cl. ........................................................ 385/109
(58) Field of Search ................................. 385/109, 110, 385/111, 113

(56) References Cited

U.S. PATENT DOCUMENTS

| | | |
|---|---|---|
| 4,049,597 A | 9/1977 | Motsinger |
| 4,087,567 A * | 5/1978 | Sullivan ........................ 427/2 |
| 4,479,984 A | 10/1984 | Levy et al. |
| 4,723,831 A | 2/1988 | Johnson et al. |
| 4,772,091 A | 9/1988 | Oestreich |
| 4,852,965 A * | 8/1989 | Mullin et al. ............ 350/96.23 |
| 5,246,782 A * | 9/1993 | Kennedy et al. ............ 428/421 |
| 5,262,236 A | 11/1993 | Brannon |
| 6,370,303 B1 * | 4/2002 | Fitz et al. .................... 385/113 |

FOREIGN PATENT DOCUMENTS

| | | |
|---|---|---|
| EP | 0 853 249 | 7/1998 |
| EP | 1 094 347 | 4/2001 |
| GB | 1 462 159 | 1/1977 |

* cited by examiner

*Primary Examiner*—Javaid Nasri
(74) *Attorney, Agent, or Firm*—Inger H. Eckert; James J. Dottavio

(57) ABSTRACT

A premises cable having a plurality of inorganic fibers for protecting and suspending a plurality of optical fibers within a polymer jacket. The inorganic fibers, preferably glass fibers, do not generate smoke or fire and thus offer an improvement over traditional polyaramid fibers used as reinforcement materials in premises cables. A sizing composition is applied to the inorganic fibers to prevent ribbonization of the inorganic fibers, thereby preventing attenuation of the optical fibers caused by such a ribbonization and also allowing a uniform distribution of glass fibers around the optical fibers to further protect the optical fibers.

10 Claims, 1 Drawing Sheet

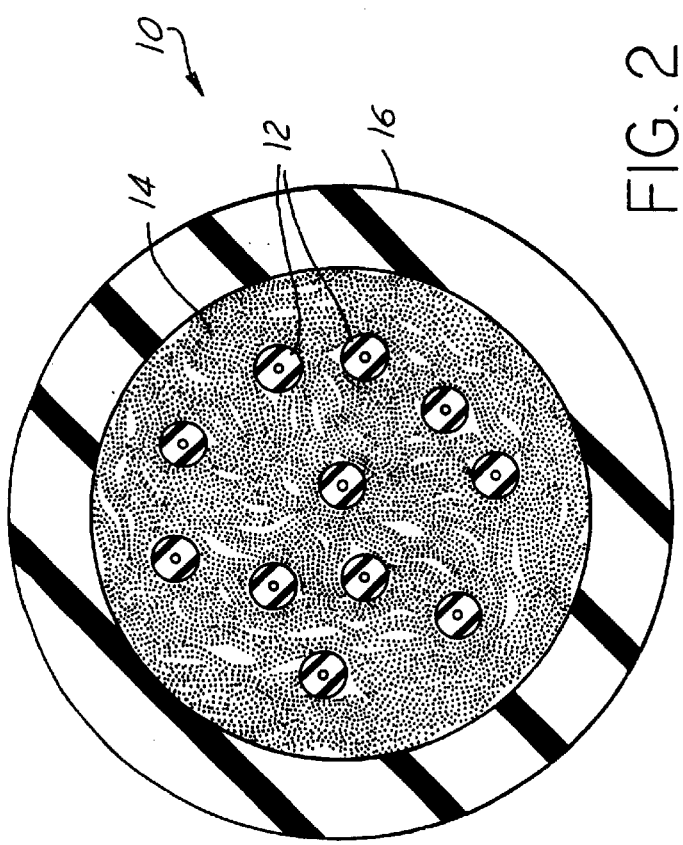
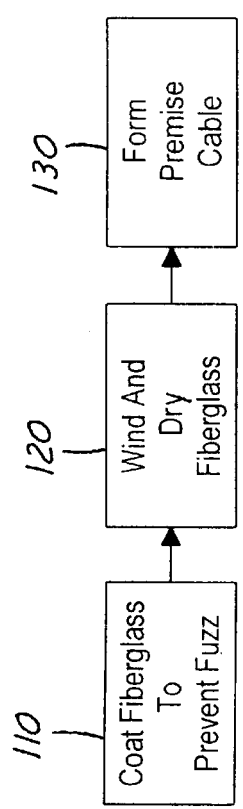
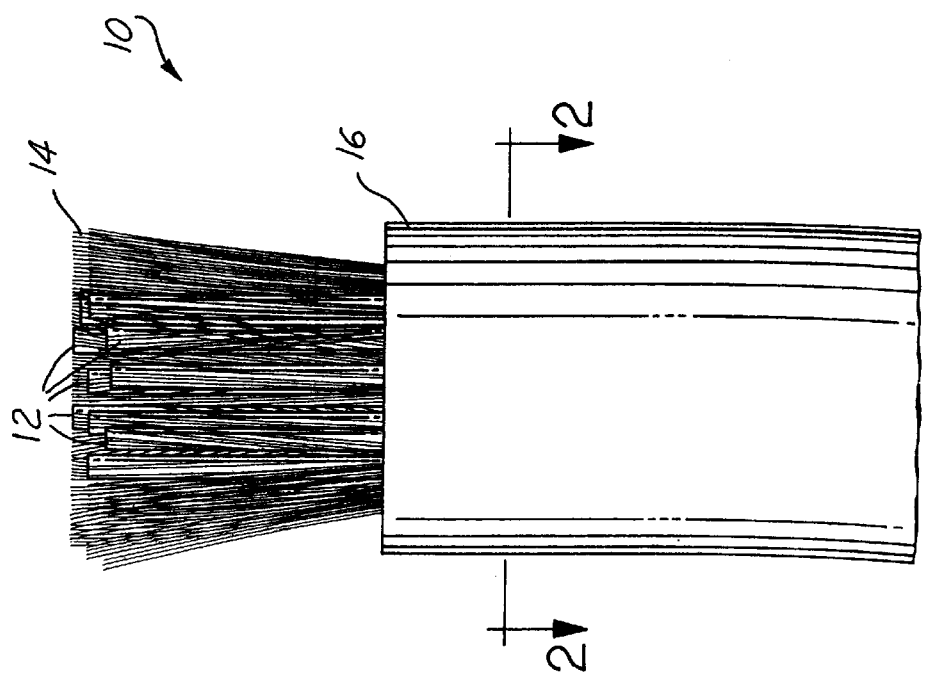

PREMISES CABLE WITH FIBERGLASS REINFORCEMENT

The present invention relates generally to indoor communication cables and more specifically to glass fiber reinforced premises cables.

BACKGROUND OF THE INVENTION

Fiberoptic cables are commonly used to provide electronic communication in a wide variety of indoor and outdoor communication systems. One type of indoor fiberoptic cables, typically referred to as premises, plenum, or riser cables, are comprised of buffered optical fibers and loose reinforcement polyaramid fibers contained within a fire resistant polymer jacket.

The polyaramid fibers are typically coated with a coating that prevents abraiding during fiber generation.

Polyaramid fibers have many important functions within premises cables. First, the polyaramid fibers provide some tensile strength during the installation process. Second, the polyaramid fibers act as a cushion and space filler to protect and suspend the loose fiberoptic fibers within the polymer jacket. Third, the polyaramid fibers prevent the adhesion of the fiberoptic fibers to the polymer jacket wall.

One problem with the use of polyaramid fibers in premises cable is that the aramid fiber may add additional fuel for fire and smoke generation in certain flammable situations. This is due to the fact that aramid fibers are organic fibers.

It is therefore highly desirable to provide a method for reducing or eliminating the possibility of fire or smoke generation in reinforcement fibers used in premises cables while maintaining the structural and protection attributes of the reinforcement fiber. It is also highly desirable that the reinforcement fibers used in premises cable do not ribbonize, or form bundles, that bend the fiberoptic fibers within the polymer jacket. This bending may lead to attenuation of the fiberoptic fibers, which can limit the ability of the fiber to transmit a light signal.

SUMMARY OF THE INVENTION

It is thus an object of the present invention to provide a method for reducing or eliminating the possibility of fire or smoke generation in reinforcement fibers used in premises cables while maintaining the structural and protection attributes of the reinforcement fibers used in indoor communication cables.

The above object is accomplished by replacing the polyaramid fibers typically found in premises cables with a sized glass reinforcement fiber. As the glass fibers are inorganic, not organic, these fibers would reduce the possibility of fire or smoke generation within the premises cable. This is especially beneficial for indoor communication cables such as a premises cable that are used in commercial or residential buildings.

In addition, the glass fibers provide similar structural and protection characteristics as compared with polyaramid fibers. First, the glass fibers provide some tensile strength during the installation process. Second, the glass fibers act as a cushion and space filler to protect and suspend the loose fiberoptic fibers within the polymer jacket, thereby minimizing attenuation of the fiberoptic fibers. Third, the glass fibers prevent the adhesion of the fiberoptic fibers to the polymer jacket wall. Fourth, as the glass fibers are non-ribbonized (individually sized strands, not bundle or bunched), they tend to provide uniform insulation throughout the interior of the premises cable and around the loose fiberoptic fibers. Fifth, installation of the glass fiber reinforced cable is preferred, as the polyaramid fibers do not cut as well using installation tooling.

Other objects and advantages of the present invention will become apparent upon considering the following detailed description and appended claims, and upon reference to the accompanying drawings.

BRIEF DESCRIPTION OF THE DRAWINGS

FIG. 1 is a perspective view of a premises cable according to a preferred embodiment of the present invention;

FIG. 2 is a sectional view of the premises cable of FIG. 1 taken along line 2—2; and FIG. 3 is a logic flow diagram for forming a premises cable according to one preferred embodiment of the present invention.

DETAILED DESCRIPTION AND PREFERRED EMBODIMENTS OF THE INVENTION

Referring now to FIGS. 1 and 2, a premises cable for use in indoor communications systems is shown generally as 10. The premises cable 10 consists essentially of a plurality of randomly placed, tight buffered optical fibers 12 and a plurality of loose glass fibers 14 contained within a fire resistant polymer jacket 16.

The optical fibers 12 are comprised of long, thin flexible fibers made of glass, plastic, or other transparent material that are well known in the art. Preferably, the fibers 12 are made of fused silica and are used as a pathway to transmit informational images in the form of light. The fibers 12 preferably are tight buffered and coated with a layer of acrylic coating.

The fire resistant polymer jacket 16 is similarly well known in the art, and may be comprised of a wide variety of polymers that are both water and fire resistant. Preferably, the jacket 16 is formed of a thin layer of polyvinyl chloride (PVC). In alternative embodiments, the jacket 16 may be formed of a thin layer of polyethylene having a non-halogenated fire retardant such as a metal hydrate. One example of a metal hydrate that may be used in alumina trihydrate.

The loose glass fibers 14 have many important functions. First, the glass fibers 14 provide some tensile strength during the installation process. Second, the glass fibers 14 act as a cushion and space filler to protect and suspend the loose fiberoptic fibers 12 within the polymer jacket 16. Third, the glass fibers prevent the adhesion of the fiberoptic fibers to the polymer jacket wall. Fourth, because glass fibers are inorganic, they does not generate smoke or fire in the presence of heat or electrical spark as does traditional organic fibers such as polyaramid fibers. As such, it acts as a fire barrier. This is especially important in that the premises cable 10 of the present invention is most likely to be used in an indoor setting, such as in a residential or commercial building.

The glass fibers 14 are preferably single end E-glass roving fibers, or Type 30® roving fibers, that can be wound in a format that is commonly used to feed cable manufacturing equipment. However, other types of glass fibers may be used as well. These include substatnially boron-free glass fibers (such Advantex® glass fibers, available from Owens Corning), S-glass or other high strength glass fibers (such as ZenTron® glass fibers, manufactured by Advanced Glass-fiber Yarns, LLC), E-CR glass, or any other type of glass as long as it meets the ultimate tensile strength, crush, impact, and fire resistance of the cable.

The fibers 14 are protected with a sizing that has many important functions. First, the sizing allows the fibers 14 to feed through the cabling process without abraiding the glass fiber 14, commonly known as fizzing. Also, the sizing aids in minimizing the formation of glass fibers 14 ribbons which may cause attenuation, or kinking, of the optical fibers 12, thereby preventing or limiting transmission of their respective light signals. This also allows a more uniform distribution of glass fibers 14 around the optical fibers and within the polymer jacket 16, which further helps to protect the optical fibers 12.

The sizing that is used on the glass fibers 14 contains at least one film former and at least one lubricant material, preferably in a ratio of between approximately 1:1 and approximately 1:6 film former to lubricant by weight. The coating level of the sizing preferably does not exceed approximately 2.0 percent by weight of the sizing and glass fiber 14 combined, and is ideally between approximately 0.2 and 0.9 percent by weight of the of the sizing and glass fiber. This is done to limit smoking and fire that may occur, as the sizing is a potential fuel for such an occurrence.

Preferably, the film former comprises a water-resistant thermoplastic or thermosetting flexible polymer. The film former functions to protect and toughen the glass fibers 14. The film former also acts as a processing aid. The film former is applied by any number of different applications that are well known in the art for adding sizing to a fiberglass roving such as dipping or spraying. The film former must be able to be emulsified, dissolved or otherwise suspendable in an aqueous medium. One such preferred film former is an epoxy-based film former. However, other polymer materials such as polyurethanes and polyethylenes are also contemplated. In the case of polyethylene, another film former such as polyvinyl pyrilidone (PVP) is typically added to prevent tackiness of the polyethylene polymer in solution. The lubricant material is typically a non-ionic material and functions to plasticize the film former. The lubricant material may consist of one material or a combination of commercially known lubricating materials known in the sizing compositions. For example, stearates and oleates of polyethylene glycol and other non-ionic petroleum-based lubricants are typically used.

In addition, other additives may be added to the sizing composition to aid in processability. For example, silanes or methacryloxysilanes may be added that function to toughen the glass fiber 14 surface and provide reactive sites for bonding the glass fibers 14 to the sizing. To help hydrolyze the silane, an acid such as acetic acid may be added, wherein the pH is adjusted to around 4.5. In addition, PVP may be added in non-polyethylene-based sizings to protect and toughen the glass fibers 14, to increase glass fiber 14 strand integrity and stiffness, and/or to reduce or eliminate filament to filament bonding. An example of a preferred sizing composition for use on the glass fibers 14 in a preferred embodiment of the present invention is shown below in Table 1.

TABLE 1

| DESCRIPTION | ACTIVE SOLIDS | % MIX SOLIDS | % STRAND SOLIDS |
| --- | --- | --- | --- |
| Acid | 100.0% | 0.024 | 0.140 |
| Epoxy | 56.0% | 4.599 | 14.760 |
| Polyvinyl Pyrilidone | 20.0% | 0.160 | 1.720 |
| PEG 400 Mono Oleate | 100.0% | 0.530 | 25.310 |
| PEG 400 Mono Iso Stearate | 100.0% | 0.440 | 21.010 |
| Non-Ionic Petroleum | 100.0% | 0.440 | 21.010 |
| Methacryloxy Silane | 83.0% | 0.840 | 3.280 |
| Silane | 40.00% | 0.070 | 1.340 |
| Deionized Water | 0 | 92.657 | 0 |

To form the sizing composition as shown in Table 1, six premixes are made. In the first premix, a portion of the deionized water is mixed with the acetic acid and methacryloxysilane. In a second premix, the film former resin, here an epoxy resin, is prepared. In a third premix, a portion of the deionized number is mixed with the monooleate polyethylene glycol and the monoisostearate polyethylene glycol. While PEG 400 is listed in Table 1, of course other molecular weights of polyethylene glycol may be used, including PEG 200, 600, or 800. In a fourth premix, another portion of the deionized water is mixed with the non-ionic petroleum lubricant. In a fifth premix, a portion of the deionized water is mixed with the polyvinyl pyrilidone. In a sixth premix, a portion of the deionized water is mixed with the silane. The six premixes are then added together in order to form the sizing composition. The sizing composition as in Table 1 has a film former to lubricant ratio of strand solids of 1:4.78.

The premises cable 10 may be formed by many different methods. One preferred method is described in FIG. 3. First, in Step 100, the sizing composition is applied to the glass fibers 14. The sizing may be applied using either a traditional roller applicator or through a continuous pumped head applicator. In either method, the sizing is essentially wiped onto the glass fiber as it is drawn through the applicator. Metering is done by controlling the roller speed when using a roller applicator or by pump rate when using a continuous pumped head applicator.

Next, in Step 110, the sized glass fiber 14 is wound, dried and formed into a tight wound square edge or tapered cone package on a core device such as a tube, cone, spool or bobbin. This is accomplished in one of two ways. In one method, the sized glass fiber 14 is wound onto a tightly wound square edged or tapered cone package on a core device such as a tube, cone, spool or bobbin and subsequently dried. In an alternative method, the sized glass fiber 14 is wound into a traditional forming package, dried, and later wound into a tightly wound square edged or tapered cone package on a core device such as a tube, cone, spool or bobbin.

Next, in Step 120, the cabling package, or premises cable 10, is formed. This is accomplished in multiple steps. First, a first plurality of sized glass fibers 14 are applied using a linear feed or server. Next, the optical fibers 12 are applied in an S-Z stranding pattern, in which the optical fibers 12 are twisted clockwise on one rotation and counterclockwise on the next rotation. This process is repeated until a sufficient amount of optical fiber 12 is added to negate the effect of contraction or expansion of the finished premises cable 10. Next, another plurality of sized glass fibers 14 is applied using either a linear feed or a server. Finally, the polymer jacket 16 is applied using a tube extrusion process to form the premises cable 10.

The present invention offers an alternative reinforcement material for use in indoor communication cables such as a premises cable. These new premises cables having glass fiber reinforcement are ideally suited for use in commercial or residential buildings. As glass fibers are inorganic, unlike polyaramid fibers, these fibers would reduce the possibility of fire or smoke generation within the premises cable. In addition, the glass fibers provide similar structural and protection characteristics as compared with polyaramid fibers. Also,.the glass fibers provide some tensile strength during the installation process. Further, the glass fibers act as a cushion and space filler to protect and suspend the loose fiberoptic fibers within the polymer jacket. Finally, the glass fibers prevent the adhesion of the fiberoptic fibers to the polymer jacket wall.

While the invention has been described in terms of preferred embodiments, it will be understood, of course, that the invention is not limited thereto since modifications may be made by those skilled in the art, particularly in light of the foregoing teachings.

What is claimed is:

1. A premises cable comprising:

a fire resistant polymer jacket;

a plurality of optical fibers;

a plurality of non-ribbonized inorganic fibers, said plurality of inorganic fibers used to protect and suspend said plurality of optical fibers within said fire resistant polymer jacket while minimizing or preventing smoke or fire generation; and a first amount of a sizing composition substantially encasing each of said plurality of inorganic fibers, said sizing composition comprising at least one film former and at least one lubricant material wherein said first amount of said sizing composition is sufficient to prevent ribbonization of said plurality of inorganic fibers and comprises between 0.2 and 2.0 percent of the strand weight of said plurality of inorganic fibers.

2. The premises cable of claim 1, wherein the ratio of said at least one film former to said at least one lubricant is between 1:1 and 1:6 of strand solids deposited on said plurality of inorganic fibers.

3. The premise cable of claim 1, wherein said fire resistant polymer jacket is selected from the group consisting of a polyvinyl chloride jacket and a polyethylene jacket having a non-halogenated fire retardant additive.

4. The premise cable of claim 1, wherein said plurality of inorganic fibers comprises a plurality of e-glass glass fibers.

5. The premise cable of claim 1, wherein said plurality of inorganic fibers is selected from the group consisting of a plurality of e-glass fibers, a plurality of E-CR glass fibers, a plurality of substantially boron-free glass fibers, and a plurality of s-glass glass fibers.

6. The premises cable of claim 1, wherein said at least one film former comprises an epoxy resin.

7. The premise cable of claim 2, wherein said at least one film former further comprises a polyvinyl pyrilidone resin.

8. The premises cable of claim 1, wherein said at least one lubricant material is selected from the group consisting of a non-ionic petroleum lubricant, a monooleate polyethylene glycol, a monoisostearate polyethylene glycol, and combinations thereof.

9. The premises cable of claim 1, wherein said sizing composition also has at least one additive material.

10. The premise cable of claim 9, wherein said at least one additive material is selected from the group consisting of a methacryloxysilane material and a silane material.

* * * * *

UNITED STATES PATENT AND TRADEMARK OFFICE
CERTIFICATE OF CORRECTION

PATENT NO. : 6,519,397 B2
DATED : February 11, 2003
INVENTOR(S) : James R. Priest and Richard N. Lehman It is certified that error appears in the above-identified patent and that said Letters Patent is hereby corrected as shown below:

<u>Column 6,</u>
Lines 7, 11, 13, 21 and 30, "premise" should be -- premises --

Signed and Sealed this

Second Day of September, 2003

JAMES E. ROGAN
*Director of the United States Patent and Trademark Office*